May 30, 1933.    P. HESSINGER    1,912,198
WINDSHIELD WIPER
Filed July 8, 1932
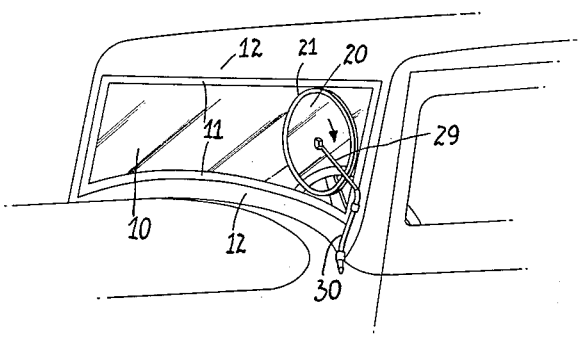
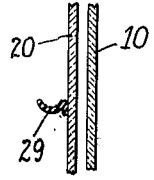
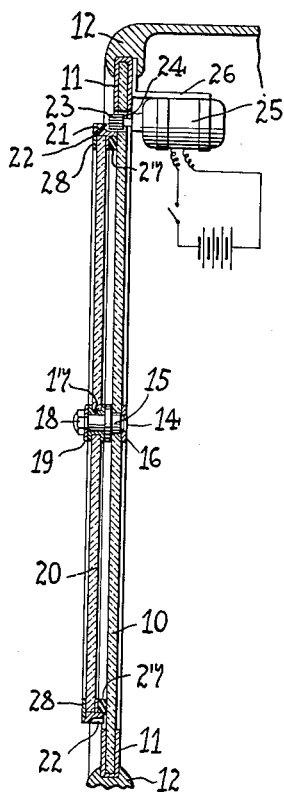
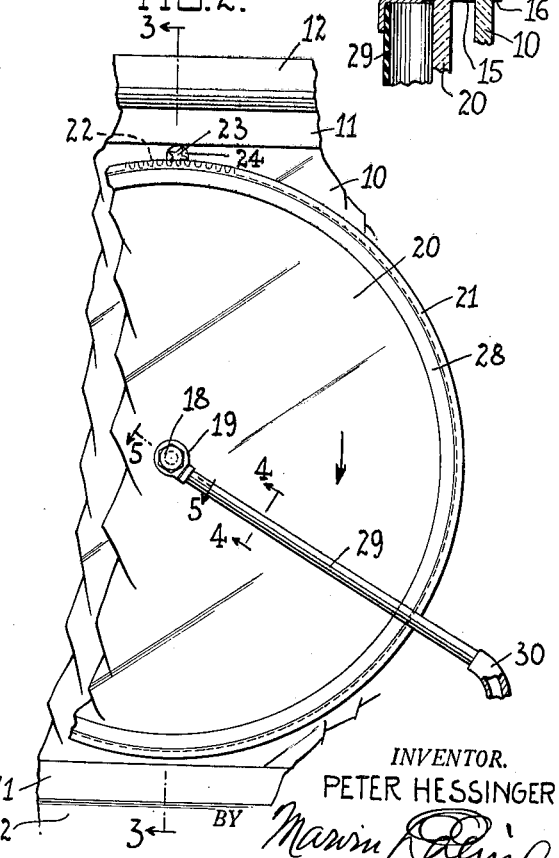
INVENTOR.
PETER HESSINGER
BY
his ATTORNEY Patented May 30, 1933

1,912,198

UNITED STATES PATENT OFFICE

PETER HESSINGER, OF BUFFALO, NEW YORK

WINDSHIELD WIPER

Application filed July 8, 1932. Serial No. 621,356.

This invention relates to wind shield wipers and more particularly to a type in which the shield is guarded by a transparent disc constantly maintained free of all adherent particles.

An object of the invention is to provide a circular transparent disc mounted in close proximity to the wind shield and caused to constantly rotate, when required for use, against a stationary wiper arranged to deliver all accumulations outwardly.

A further feature is in the provision of a motor directly connected with a frame, in which the disc is marginally encased, to cause the disc to revolve at any time required.

Another purpose is to produce a shield clearing device in which no moving parts are employed that can cause interception of the vision or annoyance by failure of operation.

These advantageous objects are attained by the novel construction and combination of few and simple parts as hereinafter described and shown in the annexed drawing, forming a material part of this disclosure, and in which:

Figure 1 is a fragmentary perspective view of a conventional type of automobile illustrating the application of the invention.

Figure 2 is a fragmentary front elevational view of a wind shield, showing the device in operative position.

Figure 3 is a transverse sectional view taken on line 3—3 of Fig. 2.

Figure 4 is a sectional view taken on line 4—4 of Fig. 2 and drawn to an enlarged scale.

Figure 5 is another sectional view taken on line 5—5 of Fig. 2.

As indicated in Fig. 1, the usual type of wind shield, designated by the numeral 10, is made of transparent material, as glass, its edges being fixed in a frame 11 securely set in an opening having beaded edges 12 at the front of the vehicle.

In applying the device the wind shield has formed through it an opening 14, midway its upper and lower edges and near one end, to receive the reduced, base portion of a stud 15, its further reduced, inner extending end passing through to receive a washer 16 and be headed thereover thereby rigidly holding the stud.

On the other side of the stud collar is revolubly mounted a double flanged bushing 17 held in place by a nut 18 fitting the outer end of the stud, and intermediate the nut and bushing is the upper end of a plate bracket 19.

The bushing 17 is set centrally in a transparent disc 20, its periphery being fixedly enframed in a ring 21 having circumferential teeth 22 meshed with a pinion 23 fixed on the end of the shaft of a motor 25 carried by a bracket 26 fixed on some convenient portion of the vehicle, the shaft and pinion reaching through an opening 24 in the wind shield. The motor shown is electrically actuated by a battery controlled by a switch, but obviously any type of motor may be used.

An elastic gasket 27, carried by the ring 21, makes contact with the shield 10 as the device is revolved and a thin flexible washer 28 is used to connect the ring with the disc, preventing the entrance of dust, moisture, rain, snow, sleet, etc., to the space between the disc and shield.

Carried by the bracket 19 is one end of a stationary wiper arm 29 held by the stud 15 in contact with the outer surface of the disc 20, this arm being inclined diagonally downward and shaped to produce a trough effect to gather collections from the disc as it revolves thereagainst and deliver to a tube 30 leading downwardly and outwardly from the vehicle.

It will be understood that the motor is under control of the operator of the vehicle to stop and start the disc as may be desired, and that the motor may be placed at any convenient location in which its shaft can be operatively engaged to drive the gearing.

The disc and shield are both transparent and there are no parts, waving, reciprocating or otherwise moving, interposed to obstruct the view of an operator, as may be noted.

Changes in structure and modifications may be made without departing from the spirit of the invention denoted in the appended claim.

Having thus described the invention, what is claimed as new and desired to secure by Letters Patent, is:—

In a vehicle having a transparent wind shield, provided with an opening near its upper edge, a frame in which said shield is mounted, a bracket carried by said frame, a motor fixed on said bracket, the motor shaft extending through the wind shield opening, a stud fixed centrally and at one end in said shield, a transparent imperforate disc rotatable on said stud adjacently in front of said shield within the limits of said frame, a toothed ring surrounding said disc and attached thereto, a packing ring carried by said toothed ring to impinge on said shield, and a pinion on the motor shaft engaging said toothed ring to rotate said disc when said motor is operating.

In witness whereof I have signed my name to this specification.

PETER HESSINGER.